United States Patent
Munz

(10) Patent No.: US 9,501,324 B2
(45) Date of Patent: Nov. 22, 2016

(54) COMPUTER SYSTEM AND CONTROL APPARATUS COMPRISING AN INDUSTRIAL ROBOT AND METHOD FOR CONTROLLING MOTION OF AN INDUSTRIAL ROBOT

(75) Inventor: Heinrich Munz, Bergatreute (DE)

(73) Assignee: KUKA Roboter GmbH, Augsburg (DE)

( * ) Notice: Subject to any disclaimer, the term of this patent is extended or adjusted under 35 U.S.C. 154(b) by 1610 days.

(21) Appl. No.: 12/811,022

(22) PCT Filed: Jan. 13, 2009

(86) PCT No.: PCT/EP2009/050307
§ 371 (c)(1),
(2), (4) Date: Jun. 28, 2010

(87) PCT Pub. No.: WO2009/090164
PCT Pub. Date: Jul. 23, 2009

(65) Prior Publication Data
US 2010/0287556 A1    Nov. 11, 2010

(30) Foreign Application Priority Data

Jan. 18, 2008    (DE) .................. 10 2008 005 124

(51) Int. Cl.
*G06F 9/50* (2006.01)
*G06F 9/48* (2006.01)

(52) U.S. Cl.
CPC .......... *G06F 9/5044* (2013.01); *G06F 9/4887* (2013.01); *G06F 2209/483* (2013.01)

(58) Field of Classification Search
USPC ....................................................... 718/100
See application file for complete search history.

(56) References Cited

U.S. PATENT DOCUMENTS

| | | | |
|---|---|---|---|
| 5,506,787 A * | 4/1996 | Muhlfeld et al. | 700/181 |
| 5,568,593 A * | 10/1996 | Demarest et al. | 700/247 |
| 6,519,498 B1 * | 2/2003 | Jevtic et al. | 700/101 |
| 7,463,948 B2 * | 12/2008 | Orita | 700/245 |
| 7,742,838 B2 * | 6/2010 | Weiβ | 700/248 |
| 2001/0037161 A1 * | 11/2001 | Hess et al. | 700/96 |
| 2003/0114959 A1 * | 6/2003 | Sakamoto et al. | 700/245 |
| 2006/0026322 A1 * | 2/2006 | Chauvel et al. | 710/260 |
| 2006/0150185 A1 | 7/2006 | McKenney et al. | |
| 2006/0294522 A1 | 12/2006 | Havens | |
| 2007/0083871 A1 | 4/2007 | McKenney | |

FOREIGN PATENT DOCUMENTS

WO    2007/109894 A1    10/2007

OTHER PUBLICATIONS

European Patent Office; Search Report in International Patent Application No. PCT/EP2009/050307 dated May 19, 2009; 6 pages.

\* cited by examiner

*Primary Examiner* — Thomas L Mansfield, Jr.
(74) *Attorney, Agent, or Firm* — Wood Herron & Evans LLP

(57) ABSTRACT

A system for controlling an industrial robot includes an industrial robot and a control apparatus. The control apparatus includes a multi-core processor having at least one first processor core and at least one second processor core. An operating system, which is configured to be executed by the multi-core processor, is configured to assign hard real-time tasks to the at least one first processor core and assign other tasks to the at least one second processor core. The hard real-time tasks control at least a component of the industrial robot.

19 Claims, 2 Drawing Sheets

COMPUTER SYSTEM AND CONTROL APPARATUS COMPRISING AN INDUSTRIAL ROBOT AND METHOD FOR CONTROLLING MOTION OF AN INDUSTRIAL ROBOT

TECHNICAL FIELD

The invention relates to a computer system, a control apparatus for a machine, in particular for an industrial robot, and an industrial robot.

BACKGROUND

For reasons of cost, it is desirable if possible to not use any special solutions, but instead generally available products or solutions. For this reason, there has been a tendency already since the middle of the 1990s to use products from the office environment in controlling industrial machines, for examples PCs for controlling and Ethernet as the communication technology.

But when software is used in office environments, the primary focus is on the correct functioning of the software, and not so much on an exact time aspect. The software should merely do its job within a time frame appropriate for human circumstances, i.e., in under ten seconds or even slightly less. Since in a machine control system the software determines the motion of the machine, it must work relatively precisely and synchronously with the machine motion. The faster and more precisely the machine is to move, the more exact the timing of the software must be. With modern, relatively high-precision machines it is not unusual for motors of the machine to have to be readjusted by the software 8,000 times per second (corresponding to a cycle time of 125 microseconds), or even more often. So it is not only important here that the software do its job relatively correctly, but it must also do so as fast as possible. In this connection one speaks of the real-time capability of the software. The stricter this real-time capability is, the faster and more precisely the machine is able to move.

Standard operating systems, which are also referred to as "general-purpose" operating systems and are installed on standard PCs in the office world, are normally not real-time capable, however, since after all this is not necessary for the intended use. When demand on the system is heavy, standard operating systems are more likely to focus on keeping the entire system in uniform balance, without giving priority to particular applications.

SUMMARY

The object of the present invention is therefore to implement a computer system with a standard operating system so that the latter is also suitable for controlling machines, in particular in real time.

The problem of the invention is solved by a computer system component having:
 a multi-core processor that has at least one first processor core and at least one second processor core, and
 an operating system, in particular a so-called "general-purpose" operating system, that is configured to assign real-time tasks exclusively to the first processor core and other tasks exclusively to the second processor core.

The computer system according to the invention includes the multi-core processor, which in turn has a plurality of processor cores. Processor cores are intended for executing computer programs.

The computer system according to the invention is equipped with an operating system. In general, an operating system is software that makes it possible to operate the computer system. It manages the resources of the computer system, including for example the multi-core processor and any input and output devices connected to the computer system, as well as the execution of programs running on the computer system.

The operating system is in particular a standard operating system, also known as a "general-purpose" operating system. A "general-purpose" operating system is an operating system that is not intended for a specific application, and in particular not specifically for controlling a machine, for example an industrial robot. Although some producers of "general-purpose" operating systems claim that their operating systems are real-time capable, this is not true of "general-purpose" operating systems in general. Examples of "general-purpose" operating systems are the Windows® operating systems of Microsoft® Corporation. The terms "Windows" and "Microsoft" are trademark-protected terms of Microsoft Corporation.

In order to enable real-time applications to also be executed with the standard operating system, which is normally not intended for real-time tasks, according to the invention the operating system of the computer system according to the invention is configured so that real-time tasks are assigned exclusively to the first processor core, and other tasks, i.e., tasks that arise which can be processed in non-real time, are assigned exclusively to the second processor core. This ensures that the at least one first processor core processes exclusively high-priority tasks, and does not have to use any computing power for low-priority tasks (the other tasks). Low priority tasks are for example tasks internal to the operating system.

Information science distinguishes between the terms "real time" and "model time." Real time refers to the time that processes consume in the "real world." Model time refers on the other hand to the running time self-administered by a computer program.

A real-time-capable system can be understood as a system that must respond to an event within a defined time frame. The defined time frame depends on the particular task that is to be processed in real time, and may be in the microsecond range for example for rapid digital controlling and/or regulating tasks or in the range of seconds for example for temperature adjustments or filling level monitoring.

A distinction is sometimes made between soft and hard real time. In so-called hard real time, an overrun of the defined time frame constitutes an error. In so-called soft real time, in contrast, the system generally works through the relevant inputs within the defined time frame, while in principle an isolated overrun of the defined time frame is possible and does not result in an error. According to one embodiment of the computer system according to the invention, its operating system is configured to assign exclusively the hard real-time tasks to the first processor core. The soft real-time tasks are then part of the other tasks, which are assigned exclusively to the second processor core for processing.

The operating system of the computer system according to the invention is configured, according to one embodiment, to assign first interrupt routines triggered on the basis of first external interrupts and categorized as real-time tasks or hard real-time tasks to the first processor core, and to assign second interrupt routines triggered on the basis of second external interrupts and categorized as other tasks to the second processor core.

An interrupt, in information science, is an external event, for example the expiration of time in a timer or some other hardware signal, that forces an interruption of one of the processor cores and branching into a corresponding interrupt routine. As the result of an interrupt, or of an interrupt request assigned to the interrupt, the interrupt routine, also referred to as an "interrupt service routine" (ISR), is initiated, which is processed by the processor core selected by the operating system. As the result of the interrupt request, the normal program sequence is interrupted in order to execute the interrupt routine. Once the interrupt routine has been processed, the program sequence returns again to where it was before the interruption.

As the result of this variant of the computer system according to the invention, interrupt routines triggered by external interrupts and categorized as real-time tasks or as hard real-time tasks are assigned only to the first processor core for processing. The rest of the interrupt routines are processed by the second processor core. This ensures that the at least one first processor core is reserved exclusively for processing the interrupt routines categorized as real-time tasks or as hard real-time tasks.

Depending on the system, it may be that some, if not most operating system calls cannot be executed from an interrupt request. This is possible from so-called deferred procedure calls (DPCs), however.

The computer system according to the invention can therefore be designed so that its operating system is configured to initiate first deferred procedure calls from the first interrupt routines, in order to execute the first interrupt routines categorized as real-time tasks from there, and to initiate second deferred procedure calls from the second interrupt routines, in order to execute the second interrupt routines categorized as other tasks from there. As a result, it is possible that the relevant interrupt routine as such can be executed without restriction by the relevant processor core, for example by enabling communication with program threads running on the computer system. A program thread is an individual program sequence.

Standard operating systems can be designed so that they store deferred procedure calls in a FIFO ("first-in-first-out") buffer and take them out again sequentially in the order in which they were stored, using the interrupt request from the system. According to one variant of the computer system according to the invention, its operating system is configured to assign a first FIFO buffer to the first processor core and a second FIFO buffer to the second processor core, in order to store the first deferred procedure calls temporarily in the first FIFO buffer and the second deferred procedure calls in the second FIFO buffer. That ensures that no low-priority interrupt routines intended for the second processor core block the inflow of higher-priority interrupt routines intended for the first processor core.

The operating system of the computer system according to the invention can also be configured to assign first program threads categorized as real-time tasks or as hard real-time tasks to the first processor core, and to assign second program threads categorized as other tasks to the second program core. This variant of the computer system according to the invention ensures that threads that are categorized as real-time tasks or as hard real-time tasks are processed exclusively by the first processor core, and that the first processor core does not process any threads that are categorized as other, low-priority tasks.

In another aspect of the present invention, the computer system according to the invention is used to control a machine, in particular an industrial robot, the real-time tasks being intended for controlling the machine. Accordingly, it is possible for a standard operating system that was in particular not developed for controlling a machine to also be used as a control apparatus for controlling a machine, in particular in real time. The term "control" is also used here in the meaning "regulate."

The machine to be controlled is in particular an industrial robot. Industrial robots are manipulating machines, which are equipped with useful tools for automatic handling of objects, and are programmable in a plurality of motion axes, in particular with regard to orientation, position and process sequence. Industrial robots have a computer system, which in the case of the industrial robot according to the invention is constituted essentially of the computer system according to the invention.

If the operating system of the computer system according to the invention has a multimedia service, then according to one embodiment of the control apparatus according to the invention the operating system can be configured so as to prioritize program threads categorized as real-time tasks ahead of the multimedia service. The multimedia service is provided so that the multi-core processor will process multimedia programs, in particular such as audio or video playback programs, with as few interruptions as possible. Multimedia services can be designed to automatically make additional computing time of the processor available to certain program threads by means of appropriate programming methods. It is possible, using appropriate programming methods, to specify certain program threads that the computer system, in particular the multi-core processor, is to handle preferentially by making more computing time available to them. If the operating system is a Windows® operating system from Microsoft® Corporation, and if the multimedia service is the so-called multimedia class scheduler service of that operating system, then it is possible to prioritize the real-time tasks using information that is stored in the registry of the operating system.

In another aspect of the present invention, a control apparatus for controlling a machine, in particular for controlling an industrial robot, is specified, which has a processor and an operating system, in particular a so-called "general-purpose" operating system that includes a multimedia service, the operating system being configured to prioritize real-time tasks, in particular hard real-time tasks which the processor processes to control the machine, ahead of the multimedia service. The operating system can be configured in particular to prioritize program threads categorized as real-time tasks ahead of the multimedia service. If the operating system is a Windows® operating system from Microsoft® Corporation, then the multimedia service is in particular the multimedia class scheduler service of that operating system.

BRIEF DESCRIPTION OF THE DRAWINGS

Examples of exemplary embodiments of the invention are depicted in the accompanying schematic drawing. The figures show the following.

DETAILED DESCRIPTION

Figure 1:
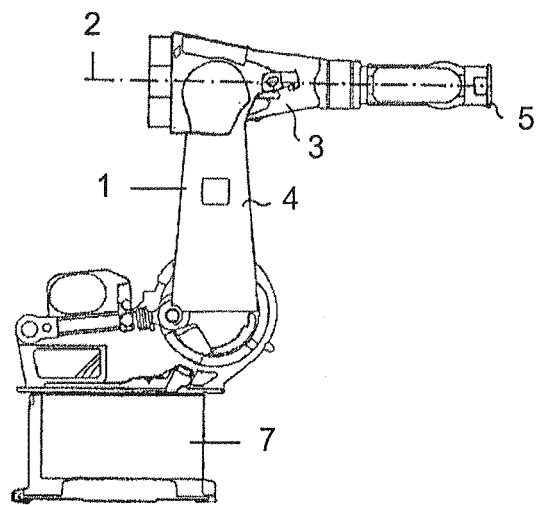
FIG. 1 an industrial robot having a control computer.
Figure 1:
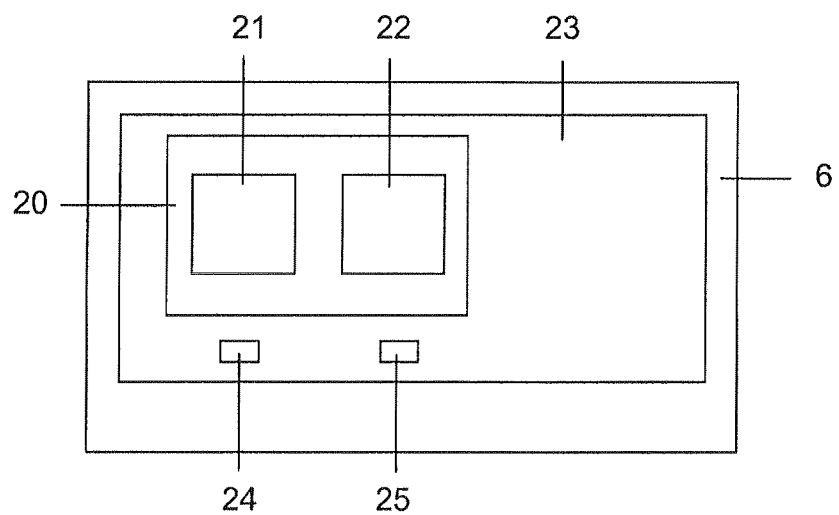

FIG. 1 shows, as an example of a machine, an industrial robot with kinematics for movements in for example six degrees of freedom. The industrial robot has, in a generally known way, a robot arm 1 with six axes of motion, joints, levers 3, 4 and a flange 5. In FIG. 1 only one of the axes of motion is provided with the reference label 2, and robot arm 1 is secured to a pedestal 7.

Each of the motion axes 2 is moved by a drive, not shown in greater detail. Each of the drives includes for example an electric motor and a gearbox, as generally known to the person skilled in the art.

Industrial robot 1 also has a control computer 6, which is connected with the drives of the industrial robot in a non-depicted manner and controls them by means of a computer program running on control computer 6, so that flange 5 of the industrial robot executes a prescribed movement.

In the case of the present exemplary embodiment, control computer 6 has a multi-core processor 20. Multi-core processor 20 is attached to a motherboard 23, and has a first processor core 21 and a second processor core 22 in its enclosure. The two processor cores 21, 22 are independent computing units. Details of other resources of control computer 6, such as memories and inputs and outputs, are not shown.

In addition, control computer 6 is configured with an operating system. An operating system in general is software that enables operation of a computer, in the case of the present exemplary embodiment operation of control computer 6. It manages the resources of control computer 6, for example multi-core processor 20 and any input and output devices connected to control computer 6, as well as the execution of computer programs running on control computer 6, such as the computer program provided for controlling the industrial robot.

In the case of the present exemplary embodiment, the operating system is what is known as a "general-purpose" operating system (standard operating system). A "general-purpose" operating system is an operating system that is not intended for a specific application, and in particular not specifically for controlling a machine, such as the industrial robot. In the case of the present exemplary embodiment, the Windows® Vista® operating system from Microsoft® Corporation runs on control computer 6. The terms "Windows," "Microsoft" and "Vista" are trademark-protected terms of Microsoft Corporation. The term "control" is also used in the meaning "regulate."

In the case of the present exemplary embodiment, the operating system of control computer 6 is configured so that it sends computing tasks that are to be performed in order to control industrial robot 1 in real time, in particular in hard real time, exclusively to first processor core 21 for processing, and the rest of the tasks, such as in particular tasks internal to the operating system or non-time-critical tasks, but also possibly soft real-time tasks, to second processor core 22 for processing.

In addition, the following types of tasks can be distinguished at different work levels: interrupts, so-called deferred procedure calls (DPCs) and program threads. A program thread is an individual program sequence.

An interrupt, in information science, is an external event, for example the expiration of time in a timer, an impulse synchronous with rotations of motion axes 2 of the industrial robot or some other hardware signal, that forces an interruption of one of the processor cores 21, 22 and branching into a corresponding interrupt routine. As the result of an interrupt, or of an interrupt request assigned to the interrupt, the interrupt routine, also referred to as an "interrupt service routine" (ISR), is initiated, which is processed by the processor core 21, 22 selected by the operating system. As the result of the interrupt request, the normal program sequence of the relevant processor core 21, 22 is interrupted in order to execute the interrupt routine. Once the interrupt routine has been processed, the program sequence returns again to where it was before the interruption.

In the case of the present exemplary embodiment, the assignment of certain tasks to the two processor cores 21, 22 is realized in part as follows:

The interrupts that interrupt the normal program sequence of control computer 6 have the highest priority in the system, and are triggered by external events. In the case of the present exemplary embodiment, the operating system of control computer 6 is initialized so that certain interrupts are sent only to a particular one of the two processor cores 21, 22 for processing of their interrupt routines. In the case of the present exemplary embodiment, the operating system is configured so that interrupts that are intended for controlling the industrial robot and whose interrupt routines must be processed in particular in real time are sent exclusively to the first processor core 21. All other interrupts are sent to the second processor core 22 for processing of their interrupt routines. That ensures that the first processor core 21 is allocated essentially only interrupt routines of higher-priority interrupts, in particular interrupts that are to be processed in real time, and that its computer power is not used by low-priority tasks.

In the case of the Windows® Vista® operating system used here, it is possible to assign certain interrupts to predefined processor cores 21, 22 by appropriate entries in the so-called registry of the operating system.

Depending on the system, it is possible that some, if not most operating system calls cannot be executed from an interrupt request. This is possible from so-called deferred procedure calls (DPCs), however. For this reason, in the case of the present exemplary embodiment, the operating system of control computer 6 is configured so that an interrupt routine triggers a deferred procedure call, which is able to execute the interrupt routine as such without restriction, for example by enabling communication with program threads running on control computer 6.

In the case of the present exemplary embodiment, the DPCs are stored temporarily in FIFO buffers and are called again sequentially for processing in the order in which they were temporarily stored, by the system's interrupt routine. "FIFO" is the abbreviation for "first-in-first-out."

In the case of the present exemplary embodiment, the operating system of control computer 6 is designed so that it assigns each processor core 21, 22 a FIFO buffer of its own. FIG. 1 depicts a first FIFO buffer 24 assigned to the first processor core 21 and a second FIFO buffer 25 assigned to the second processor core 22. Thus, in the case of the present exemplary embodiment, deferred procedure calls that are assigned to interrupts whose interrupt routines are to be processed by first processor core 21 are stored temporarily in first FIFO buffer 24. Deferred procedure calls that are assigned to interrupts whose interrupt routines are to be processed by second processor core 22, on the other hand, are stored temporarily in second FIFO buffer 25.

In the case of the present exemplary embodiment, program threads are also processed on processor 20. In order to ensure that threads that are allocated to the computer program intended for controlling the industrial robot, and in particular that must be processed in (hard) real time, can also be processed in (hard) real time by processor 20, the operating system of control computer 6 is configured so that it assigns the threads allocated to the computer program intended for controlling the industrial robot to first processor core 21 for processing. The operating system of control computer 6 assigns all other threads to second processor core 22 for processing.

With the Windows® operating system used here, this can be achieved by configuring a so-called "thread affinity mask." Many "general-purpose" operating systems include a multimedia service, by means of which multimedia programs, such as in particular audio or video playback programs, can be processed with the fewest possible interruptions. In the Microsoft® Vista® operating system this mechanism is called multimedia class scheduler service; it automatically makes more computing time of multi-core processor 20 available to certain program threads by means of appropriate programming methods. In so doing, the multimedia class scheduler service makes use of information that is stored in the registry to recognize corresponding tasks and to determine the appropriate priority of the program threads of these tasks. So-called API calls ("application program interface" calls) may be used for example for the corresponding programming methods.

Alternatively or in addition, there may be provision to give higher priority to the program threads allocated to the computer program for controlling the industrial robot, which in particular must be processed by multi-core processor 20 in real time, over the multimedia class scheduler service of the operating system, so that multi-core processor 20 processes them preferentially before the rest of the program threads.

The multi-core processor 20 shown in FIG. 1 has exactly two processor cores 21, 22. It is also possible to use a multi-core processor having more than two processor cores. In that case at least one of the processor cores is allocated to the (hard) real-time tasks and at least one multi-core processor to the other tasks.

Figure 2:
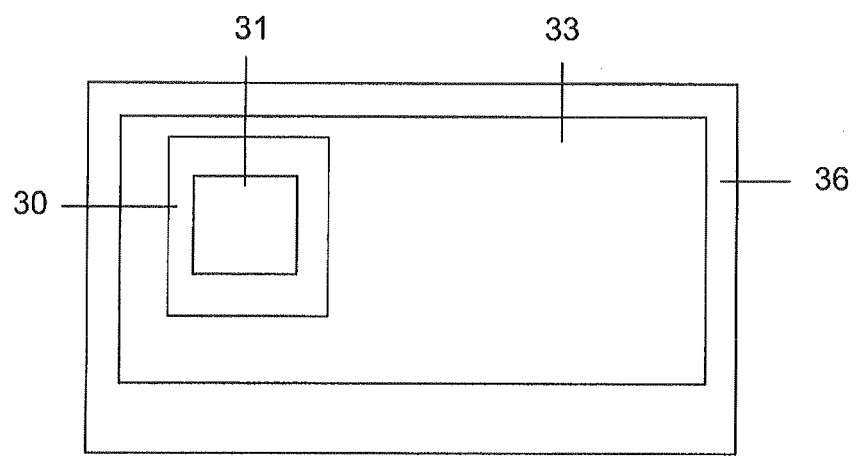
FIG. 2 an alternative control computer for the industrial robot.

FIG. 2 shows another control computer 36 that can be used instead of the control computer 6 shown in FIG. 1 to control the industrial robot. In contrast to control computer 6 of FIG. 1, control computer 36 in the case of the present exemplary embodiment has a processor 30 with a single processor core. Control computer 36 can also be provided with a multi-core processor, however. Processor 30 is attached to a motherboard 33. Details of other resources of control computer 36, such as memories and inputs and outputs, are not shown.

In addition, control computer 36 is equipped with an operating system. It manages the resources of control computer 36, for example processor 30 and any input and output devices connected to control computer 36, as well as the execution of computer programs running on control computer 36, such as a computer program provided for controlling the industrial robot.

In the case of the present exemplary embodiment, the operating system is what is known as a "general-purpose" operating system. In the case of the present exemplary embodiment, the Windows® Vista® operating system from Microsoft® Corporation also runs on control computer 6.

In the case of the present exemplary embodiment, there is provision to give higher priority to the program threads allocated to the computer program for controlling the industrial robot, which in particular must be processed by processor 30 in hard real time, over the multimedia class scheduler service of the operating system, so that processor 30 processes them preferentially before the rest of the program threads.

What is claimed is:

1. A control apparatus for an industrial robot, comprising:
   a multi-core computer processor having at least one first processor core and at least one second processor core; and
   an operating system configured to be executed by the multi-core processor, and further configured to assign hard real-time tasks solely to the at least one first processor core and assign other tasks solely to the at least one second processor core,
   wherein the hard real-time tasks control at least a component of the industrial robot.

2. The control apparatus of claim 1, wherein the operating system is further configured to:
   assign first interrupt routines triggered by first external interrupts and categorized as hard real-time tasks to the at least one first processor core; and
   assign second interrupt routines triggered on the basis of second external interrupts and categorized as other tasks to the at least one second processor core.

3. The control apparatus of claim 2, wherein the operating system is further configured to:
   execute the first interrupt routines categorized as hard real-time tasks on the at least one first processor core by initiating first deferred procedure calls from the first interrupt routines; and
   execute the second interrupt routines categorized as other tasks on the at least one second processor core by initiating second deferred procedure calls from the second interrupt routines.

4. The control apparatus of claim 3, wherein the operating system is further configured to:
   assign a first FIFO buffer to the at least one first processor core; and
   assign a second FIFO buffer to the at least one second processor core, wherein the first deferred procedure calls are temporarily stored in the first FIFO buffer, and wherein the second deferred procedure calls are temporarily stored in the second FIFO buffer.

5. The control apparatus of claim 1, wherein the operating system is further configured to:
   assign first program threads categorized as hard real-time tasks to the at least one first processor core; and
   assign second program threads categorized as other tasks to the at least one second processor core.

6. The control apparatus of claim 5, wherein the operating system includes a multimedia service and wherein the operating system is further configured to:
   prioritize the first program threads categorized as hard real-time tasks ahead of the multimedia service.

7. The control apparatus of claim 6, wherein the multimedia service is a multimedia class scheduler service of the operating system.

8. A system, comprising:
   an industrial robot; and
   a control apparatus including:
      a multi-core computer processor having at least one first processor core and at least one second processor core; and
      an operating system configured to be executed by the multi-core processor, and further configured to assign hard real-time tasks solely to the at least one first processor core and assign other tasks solely to the at least one second processor core;
   wherein the hard real-time tasks control at least a component of the industrial robot.

9. The system of claim 8, wherein the operating system is further configured to:
   assign first interrupt routines triggered by first external interrupts and categorized as hard real-time tasks to the at least one first processor core; and
   assign second interrupt routines triggered on the basis of second external interrupts and categorized as other tasks to the at least one second processor core.

10. The system of claim 9, wherein the operating system is further configured to:
- execute the first interrupt routines categorized as hard real-time tasks on the at least one first processor core by initiating first deferred procedure calls from the first interrupt routines; and
- execute the second interrupt routines categorized as other tasks on the at least one second processor core by initiating second deferred procedure calls from the second interrupt routines.

11. The system of claim 9, wherein the operating system is further configured to:
- assign a first FIFO buffer to the at least one first processor core; and
- assign a second FIFO buffer to the at least one second processor core, wherein the first deferred procedure calls are temporarily stored in the first FIFO buffer; and
- wherein the second deferred procedure calls are temporarily stored in the second FIFO buffer.

12. The system of claim 8, wherein the operating system is further configured to:
- assign first program threads categorized as hard real-time tasks to the at least one first processor core; and
- assign second program threads categorized as other tasks to the at least one second processor core.

13. The system of claim 12, wherein the operating system includes a multimedia service and wherein the operating system is further configured to:
- prioritize the first program threads categorized as hard real-time tasks ahead of the multimedia service.

14. A method of controlling motion of an industrial robot:
- on a multi-core computer processor with a first processor core and a second processor core, assigning hard real-time tasks to the first processor core; and
- assigning other tasks to the second processor core, wherein the hard real-time tasks control at least a component of the industrial robot.

15. The method of claim 14, further comprising:
- assigning first program threads categorized as hard real-time tasks to the at least one first processor core; and
- assigning second program threads categorized as other tasks to the at least one second processor core.

16. The method of claim 15, further comprising:
- prioritizing the first program threads categorized as hard real-time tasks ahead of a multimedia service.

17. The method of claim 14, further comprising:
- assigning first interrupt routines triggered by first external interrupts and categorized as hard real-time tasks to the first processor core; and
- assigning second interrupt routines triggered on the basis of second external interrupts and categorized as other tasks to the second processor core.

18. The method of claim 17, further comprising:
- in response to initiating first deferred procedure calls from the first interrupt routines, executing the first interrupt routines categorized as hard real-time tasks on the first processor core; and
- in response to initiating second deferred procedure calls from the second interrupt routines, executing the second interrupt routines categorized as other tasks on the second processor core.

19. The method of claim 18, further comprising:
- assigning a first FIFO buffer to the first processor core;
- assigning a second FIFO buffer to the second processor core, temporarily storing the first deferred procedure calls in the first FIFO buffer; and
- temporarily storing the second deferred procedure calls in the second FIFO buffer.

* * * * *